(12) United States Patent
Ankney et al.

(10) Patent No.: US 12,420,913 B2
(45) Date of Patent: Sep. 23, 2025

(54) HYDRAULIC DRAG BRAKE

(71) Applicant: Hamilton Sundstrand Corporation, Charlotte, NC (US)

(72) Inventors: Darrell E. Ankney, Dixon, IL (US); Ryan Sievert, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 2 days.

(21) Appl. No.: 18/431,859

(22) Filed: Feb. 2, 2024

(65) Prior Publication Data
US 2025/0250000 A1   Aug. 7, 2025

(51) Int. Cl.
*B64C 13/36* (2006.01)
*B64C 9/32* (2006.01)

(52) U.S. Cl.
CPC .............. *B64C 13/36* (2013.01); *B64C 9/323* (2013.01)

(58) Field of Classification Search
CPC ................................ B64C 13/36; B64C 9/323
See application file for complete search history.

(56) References Cited

U.S. PATENT DOCUMENTS

| | | | |
|---|---|---|---|
| 4,746,100 | A | 5/1988 | Davenport et al. |
| 4,850,458 | A | 7/1989 | Allan et al. |
| 4,991,800 | A | 2/1991 | Schwarz |
| 5,373,921 | A | 12/1994 | Muscatell |
| 5,944,148 | A | 8/1999 | Bae et al. |
| 6,076,767 | A | 6/2000 | Farley et al. |
| 6,189,837 | B1 * | 2/2001 | Matthews ................. B64C 9/32 244/78.1 |
| 6,848,651 | B2 | 2/2005 | Christensen |
| 7,451,856 | B2 | 11/2008 | Miskin et al. |
| 8,312,783 | B2 | 11/2012 | McKay |
| 9,739,316 | B2 * | 8/2017 | Schwartz .................. B64C 9/00 |
| 10,935,115 | B2 * | 3/2021 | Barger ................ F16H 25/2454 |
| 11,097,830 | B2 | 8/2021 | Barger |
| 11,440,640 | B2 | 9/2022 | Bae et al. |
| 11,603,079 | B2 | 3/2023 | Gaile |
| 2018/0284259 | A1 * | 10/2018 | Ankney .................... B64C 9/22 |

(Continued)

FOREIGN PATENT DOCUMENTS

| | | |
|---|---|---|
| CA | 2500887 A1 | 9/2005 |
| EP | 2727831 A1 | 5/2014 |
| FR | 1406477 A | 7/1965 |

OTHER PUBLICATIONS

Search Report issued in European Patent Application No. 25154772. 5; Date of Mailing May 22, 2025 (10 pages).

*Primary Examiner* — Justin M Benedik
(74) *Attorney, Agent, or Firm* — CANTOR COLBURN LLP

(57) ABSTRACT

A hydraulic drag brake is provided for use with a driveline. The hydraulic drag brake includes a fluid circuit including first and second loops, a first valve disposed along the first loop to allow a flow of fluid through the first loop in a first direction and to prevent a flow of the fluid through the first loop in a second direction, a second valve disposed along the second loop and a pump coupled to the driveline and configured to pump the fluid through the fluid circuit in the first direction and across the first valve with the driveline occupying a retracted position or engaging in an extend motion and in the second direction and over the second valve with the driveline occupying an extended position.

20 Claims, 4 Drawing Sheets

(56) References Cited

U.S. PATENT DOCUMENTS

| | | | |
|---|---|---|---|
| 2019/0061531 A1* | 2/2019 | Harrington | H02P 3/26 |
| 2019/0226536 A1* | 7/2019 | Ankney | F16D 55/36 |
| 2023/0322364 A1 | 10/2023 | Ungar et al. | |

* cited by examiner

HYDRAULIC DRAG BRAKE

BACKGROUND

The present disclosure relates to aircraft and, more particularly, to a hydraulic drag brake for use with an aircraft.

In aeronautics, air brakes are flight control surfaces used on an aircraft to increase drag. When extended into the airstream, air brakes cause an increase in the drag on the aircraft. When not in use, the air brakes are returned to their retracted positions and conform to the local streamlined profile of the aircraft in order to help minimize drag.

BRIEF DESCRIPTION

According to an aspect of the disclosure, a hydraulic drag brake is provided for use with a driveline. The hydraulic drag brake includes a fluid circuit including first and second loops, a first valve disposed along the first loop to allow a flow of fluid through the first loop in a first direction and to prevent a flow of the fluid through the first loop in a second direction, a second valve disposed along the second loop and a pump coupled to the driveline and configured to pump the fluid through the fluid circuit in the first direction and across the first valve with the driveline occupying a retracted position or engaging in an extend motion and in the second direction and over the second valve with the driveline occupying an extended position.

In accordance with additional or alternative embodiments, the flow of the fluid in the second direction is opposite the flow of the fluid in the first direction.

In accordance with additional or alternative embodiments, an accumulator is configured to maintain pressure on a suction side of the pump.

In accordance with additional or alternative embodiments, the first valve includes a check valve and the second valve comprises a pressure regulating valve (PRV).

In accordance with additional or alternative embodiments, the fluid flow over the PRV generates drag above a predefined torque of the driveline and hydraulic lock below the predefined torque of the driveline.

According to an aspect of the disclosure, an aircraft is provided and includes fuselage, wings extending outwardly from the fuselage and including controllable surfaces, a power distribution unit (PDU) disposed in the fuselage and configured to generate power for driving extensions and retractions of the controllable surfaces, a torque tube including the driveline disposed to transmit torque from the PDU to the controllable surfaces and the hydraulic drag brake disposed along the driveline of the torque tube.

In accordance with additional or alternative embodiments, the controllable surfaces are disposed at one or more of leading and trailing edges of the wings.

In accordance with additional or alternative embodiments, the controllable surfaces and the hydraulic drag brake are disposed at a distal end of the driveline of the torque tube.

In accordance with additional or alternative embodiments, an additional check valve is disposed along the second loop to allow the flow of the fluid through the second loop in the second direction and to prevent the flow of the fluid through the second loop in the second direction and an additional PRV is disposed along the first loop to generate drag above a second predefined torque of the driveline and hydraulic lock below the second predefined torque of the driveline.

In accordance with additional or alternative embodiments, the flow of the fluid in the second direction is opposite the flow of the fluid in the first direction.

In accordance with additional or alternative embodiments, an accumulator is configured to maintain pressure on a suction side of the pump.

According to an aspect of the disclosure, an aircraft is provided and includes fuselage, wings extending outwardly from the fuselage and including controllable surfaces, a power distribution unit (PDU) disposed in the fuselage and configured to generate power for driving extensions and retractions of the controllable surfaces, a torque tube including the driveline disposed to transmit torque from the PDU to the controllable surfaces and the hydraulic drag brake disposed along the driveline of the torque tube.

In accordance with additional or alternative embodiments, the controllable surfaces are disposed at one or more of leading and trailing edges of the wings.

In accordance with additional or alternative embodiments, the controllable surfaces and the hydraulic drag brake are disposed at a distal end of the driveline of the torque tube.

According to an aspect of the disclosure, a self-contained bi-directional hydraulic drag brake is provided for use with a driveline. The self-contained bi-directional hydraulic drag brake includes a fluid circuit, a pressure regulating valve (PRV) disposed along the fluid circuit, a hydraulic rectifier disposed along the fluid circuit downstream from the PRV and a pump coupled to the driveline and configured to pump fluid through the fluid circuit in a first direction and over the PRV and through the hydraulic rectifier with the driveline occupying a retracted position or engaging in an extend motion and in a second direction and over the PRV and through the hydraulic rectifier with the driveline occupying an extended position.

In accordance with additional or alternative embodiments, fluid flow over the PRV in the first direction and the second direction generates drag above a predefined torque of the driveline and hydraulic lock below the predefined torque of the driveline.

In accordance with additional or alternative embodiments, the flow of the fluid in the second direction is opposite the flow of the fluid in the first direction.

In accordance with additional or alternative embodiments, an accumulator is configured to maintain pressure on a suction side of the pump.

According to an aspect of the disclosure, an aircraft is provided and includes fuselage, wings extending outwardly from the fuselage and including controllable surfaces, a power distribution unit (PDU) disposed in the fuselage and configured to generate power for driving extensions and retractions of the controllable surfaces, a torque tube including the driveline disposed to transmit torque from the PDU to the controllable surfaces and the hydraulic drag brake disposed along the driveline of the torque tube.

In accordance with additional or alternative embodiments, the controllable surfaces are disposed at one or more of leading and trailing edges of the wings and the controllable surfaces and the hydraulic drag brake are disposed at a distal end of the driveline of the torque tube.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In certain circumstances, a conventional friction brake (or drag brake) is used as a no-back device on aircraft. The drag brake is placed in a torque tube that is furthest from a power distribution unit (PDU) to prevent back-driving of the system should any of the other torque tubes break. Under certain conditions, this causes a resonance problem where the brake is constantly oscillating between sticking and slipping. This happens when there is a sufficiently large difference in the static and dynamic friction between a brake rotor and brake pad material when compared with the elasticity of the driveline torsion spring connected between the PDU and brake. The conventional friction drag brake is also duty cycle limited due to constraints on hydraulic fluid temperatures.

Thus, as will be described below, a hydraulic brake device is provided and principles of hydraulic lock in order to create no-back drag torque that is required to keep a system from back-driving below a torque setpoint. Fluid of the hydraulic brake device can be pushed through a passive heat sink in order to increase the duty cycle of the system by dissipating the heat in the fluid. The hydraulic brake device can have multiple configurations including, but not limited to, a configuration characterized as having no drag torque in one direction and being settable in the other direction, a configuration characterized as having independently settable drag torques and a configuration characterized as having identical settable drag torques in each direction. In each case, the hydraulic brake device eliminates stick\slip failure modes by hydraulically locking a driveline below a torque setpoint and causing drag above that same torque setpoint by pumping fluid over a relief valve.

Figure 1:
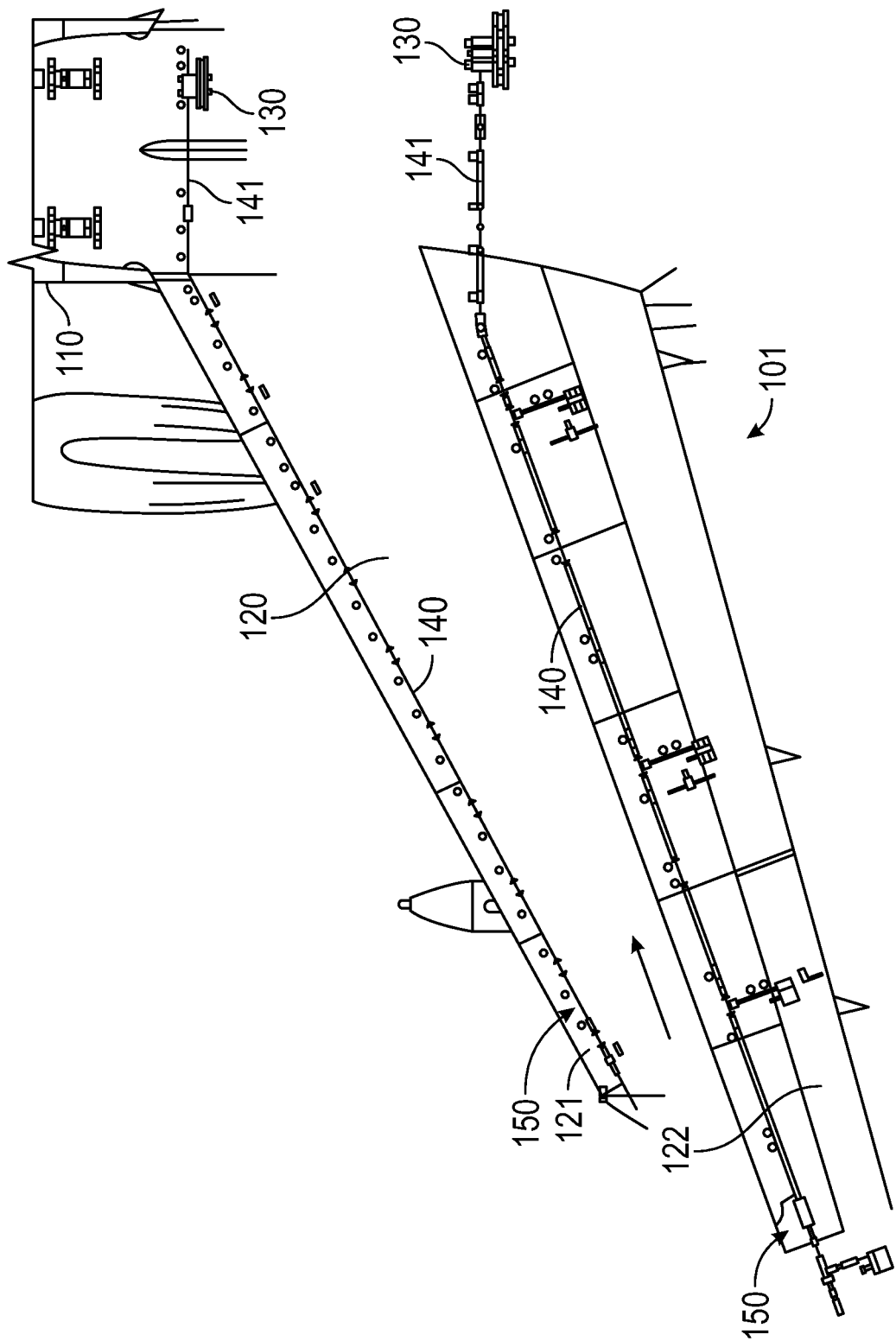
FIG. 1 is a schematic top-down view of a portion of an aircraft in accordance with embodiments.

With reference to FIG. 1, an aircraft 101 is provided and includes fuselage 110, wings 120 extending outwardly from the fuselage 110 and including controllable surfaces 121, 122, a power distribution unit (PDU) 130 that is disposed in the fuselage 110 and configured to generate power for driving extensions and retractions of the controllable surfaces 121, 122, a torque tube 140 and a hydraulic drag brake 150. The torque tube 140 includes a driveline 141 disposed to transmit torque from the PDU 130 to the controllable surfaces 121, 122. The hydraulic drag brake 150 is disposed along the driveline 141 of the torque tube 140 and will be described in greater detail below. As shown in FIG. 1, the controllable surfaces 121, 122 can be disposed at one or more of leading and trailing edges of the wings 120 and the controllable surfaces 121, 122 and the hydraulic drag brake 150 can be disposed at a distal end of the driveline 141 of the torque tube 140.

Figure 2A:
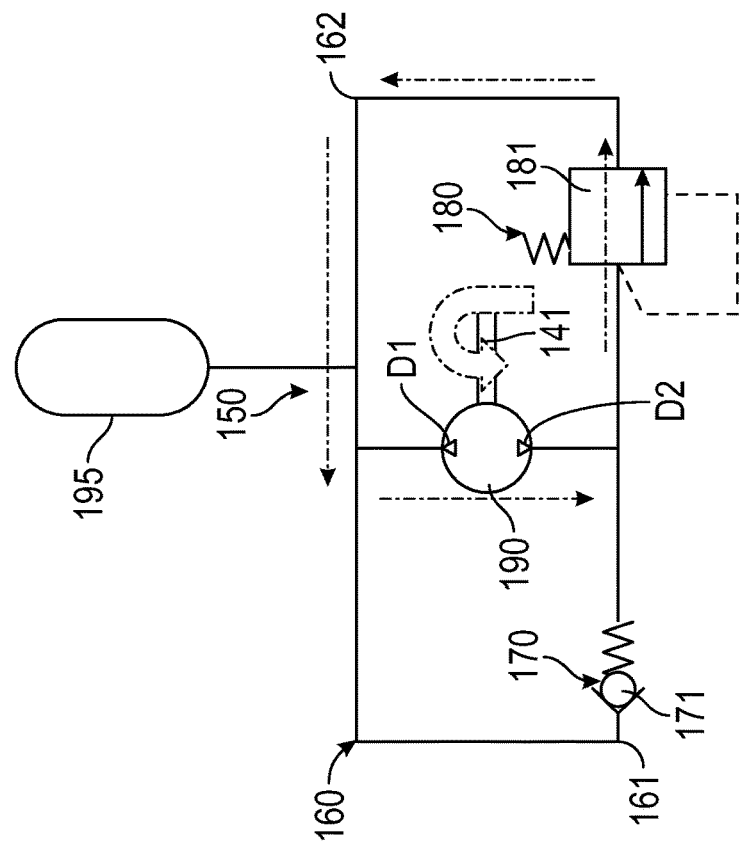
FIGS. 2A and 2B are schematic diagrams of a fluid circuit of a hydraulic drag brake for use with the aircraft of FIG. 1 in accordance with embodiments.
Figure 2B:
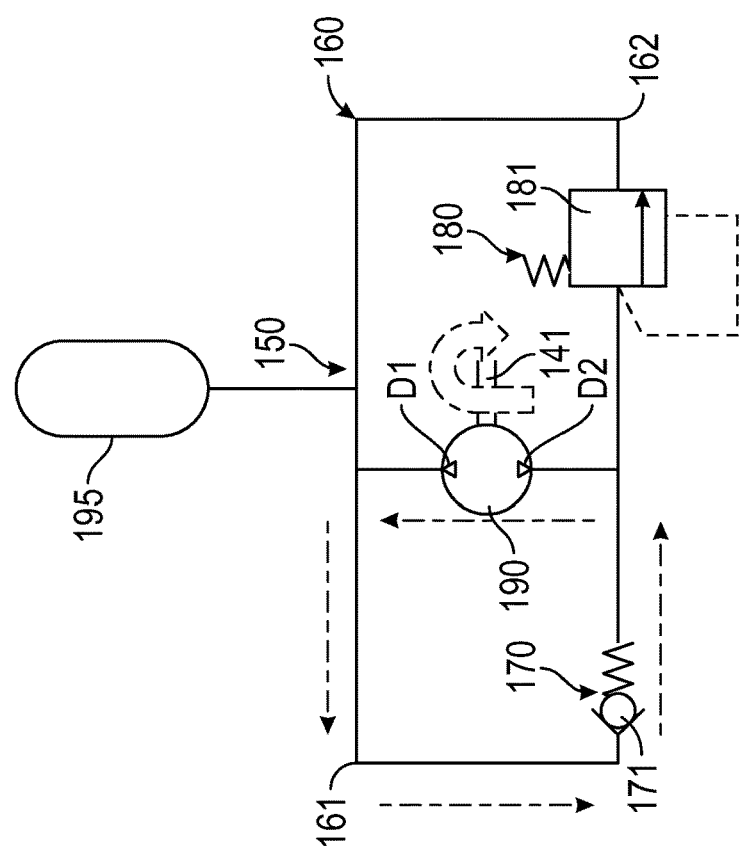

With continued reference to FIG. 1 and with additional reference to FIGS. 2A and 2B, the hydraulic drag brake 150 is provided for use with the driveline 141 of the torque tube 140. The hydraulic drag brake 150 includes a fluid circuit 160 including a first loop 161 and a second loop 162. The hydraulic drag brake 150 further includes a first valve 170 disposed along the first loop 161, a second valve 180 disposed along the second loop 162 and a pump 190. The hydraulic drag brake 150 can further include an accumulator 195 that is configured to maintain a predefined pressure on a suction side of the pump 190. The first valve 170 can include or be provided as a check valve 171 and is disposed along the first loop 161 to allow a flow of fluid through the first loop 161 in only a first direction D1 and to prevent a flow of the fluid through the first loop 161 in a second direction D2, which is opposite the first direction D1. The second valve 180 can include or be provided as a pressure regulating valve 181 and is disposed along the second loop 162. The pump 190 is coupled to the driveline 141 and is configured to pump the fluid through the fluid circuit 160 in the first direction D1 or in the second direction D2.

The pump 190 pumps the fluid through the first loop 161 of the fluid circuit 160 in the first direction D1 and across the first valve 170 (i.e., the only direction of flow permitted by the first valve 170) with the driveline 141 occupying a retracted position or with the driveline 141 engaging in an extend motion. The pump 190 pumps the fluid through the second loop 162 of the fluid circuit 160 in the second direction D2 and over the second valve 180 with the driveline 141 occupying an extended position. The flow of the fluid over the second valve 180 effectively generates drag above a predefined torque of the driveline 141 and hydraulic lock below the predefined torque of the driveline 141.

During an operation of the hydraulic drag brake 150, the driveline 141 can transmit torque from the PDU 130 to one of the controllable surfaces 121, 122 to cause the one of the controllable surfaces 121, 122 to extend. In this case, the pump 190 pumps the fluid through the fluid circuit 160 in the first direction D1 and across the first valve 170. Once the one of the controllable surfaces 121, 122 is extended and begins to experience aerodynamic loads from the surface the torque transmitted by the driveline 141 can maintain the one of the controllable surfaces 121, 122 in position. If, however, the torque tube 140 or the driveline 141 is broken (which is a condition that can be sensed by multiple aircraft systems), the pump 190 pumps the fluid through the fluid circuit 160 in the second direction D2 and toward the second valve 180, which can include or be provided as the PRV 181. In this condition with the torque tube 140 or the driveline 141 broken, torque produced by the aerodynamic loads will be less than the setpoint of the PRV 181 and as such the pump 190 will be unable to pump fluid over the PRV 181 effectively leading to hydraulic lock which maintains the one of the controllable surfaces 121, 122 in position.

Figure 3B:
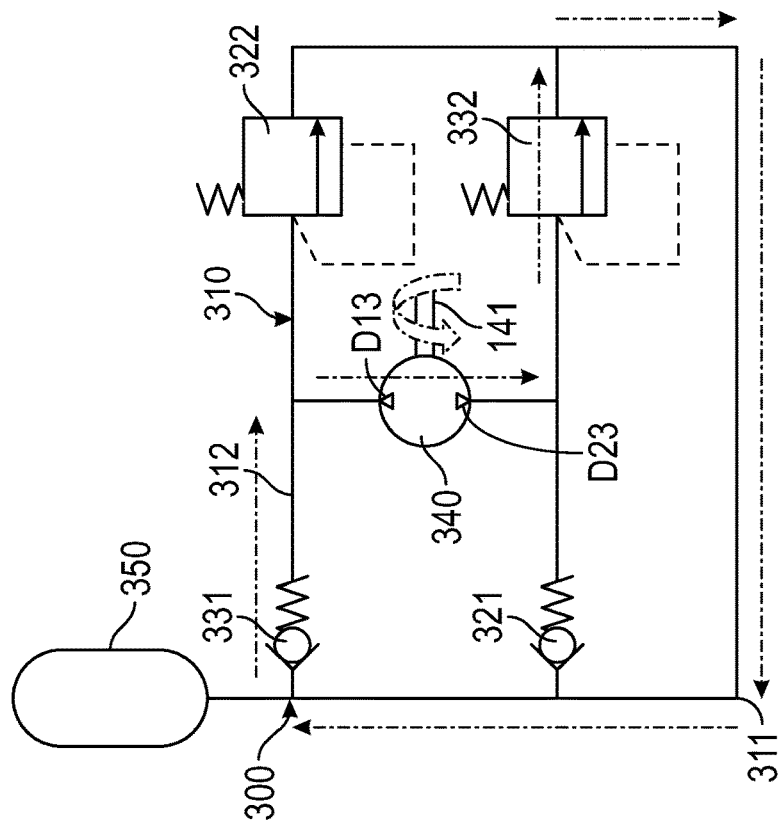
FIGS. 3A and 3B are schematic diagrams of a fluid circuit of a self-contained bi-directional hydraulic drag brake for use with the aircraft of FIG. 1 in accordance with embodiments.
Figure 3A:
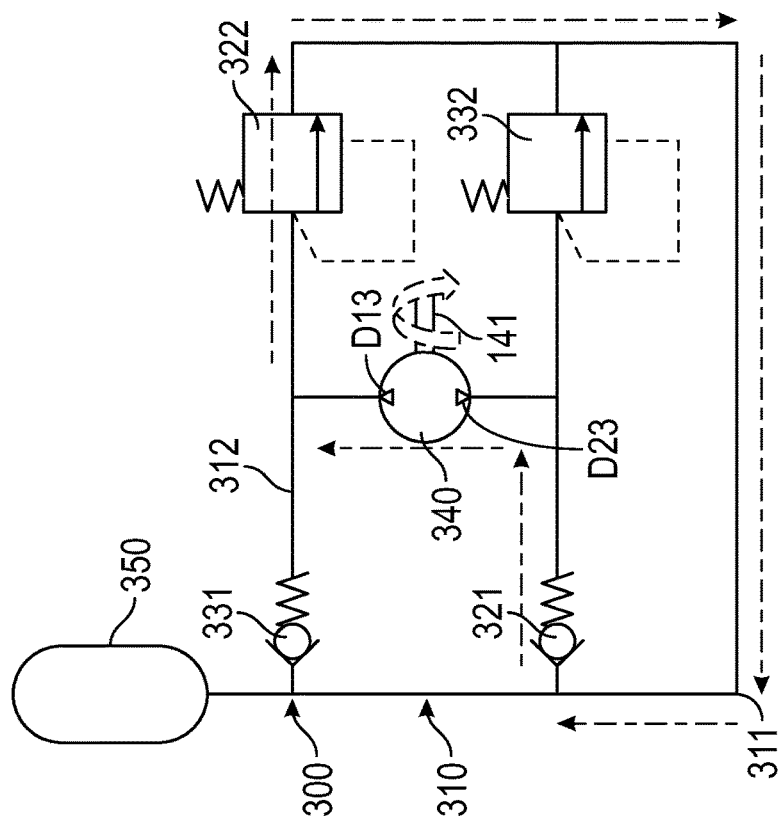

With reference to FIGS. 3A and 3B, a hydraulic drag brake 300 is provided in a similar manner as described above for the aircraft 101 of FIG. 1. That is, the hydraulic drag brake 300 is provided for use with the driveline 141 of the torque tube 140. The hydraulic drag brake 300 can be provided as a self-contained bi-directional hydraulic drag brake and includes a fluid circuit 310 including a first loop 311 and a second loop 312. The hydraulic drag brake 300 further includes a first check valve 321 and a first PRV 322 disposed along the first loop 311, a second check valve 331 and a second PRV 332 disposed along the second loop 312 and a pump 340. The hydraulic drag brake 300 can further include an accumulator 350 that is configured to maintain a predefined pressure on a suction side of the pump 340. The first check valve 321 is disposed along the first loop 311 to allow a flow of fluid through the first loop 311 in only a first direction D13 and to prevent a flow of the fluid through the first loop 311 in a second direction D23, which is opposite the first direction D13. The second check valve 331 is disposed along the second loop 312 to allow a flow of fluid through the second loop 312 in only the second direction D23 and to prevent a flow of the fluid through the second loop 312 in the first direction D13. The first and second PRVs 322 and 332 are disposed along the first and second loops 311 and 312, respectively, to operate similarly as described above and to allow for an independent setting of directional drag.

Figure 4B:
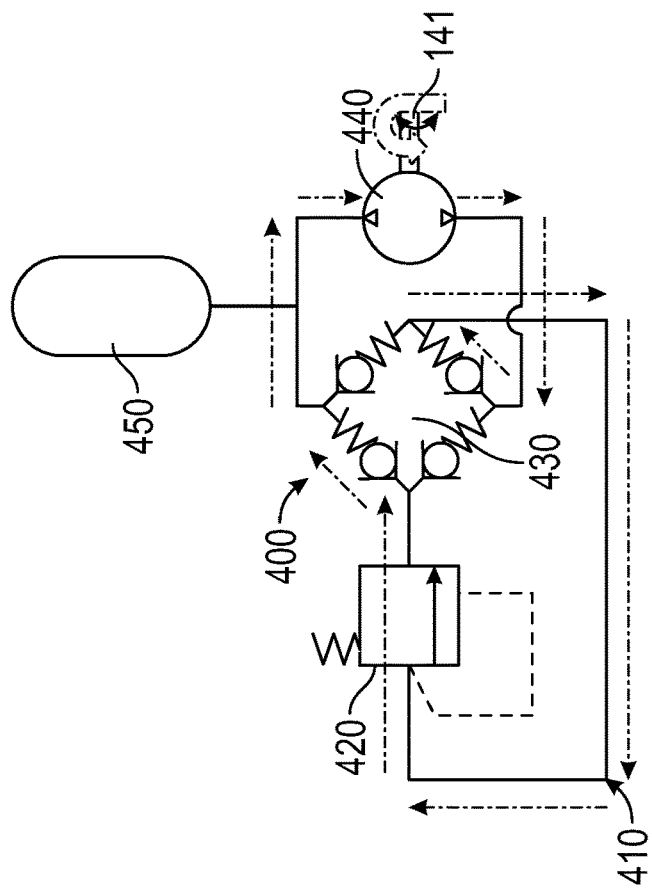
FIGS. 4A and 4B are schematic diagrams of a fluid circuit of a self-contained bi-directional hydraulic drag brake for use with the aircraft of FIG. 1 in accordance with embodiments.
Figure 4A:
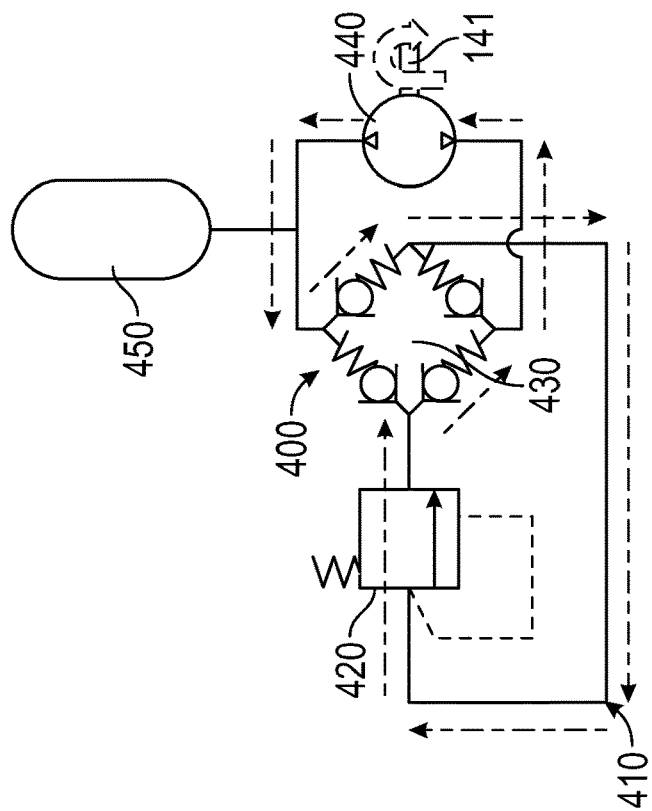

With reference to FIGS. 4A and 4B, a hydraulic drag brake 400 is provided in a similar manner as described above for the aircraft 101 of FIG. 1. That is, the hydraulic drag brake 400 is provided for use with the driveline 141 of the torque tube 140. The hydraulic drag brake 400 can be provided as a self-contained bi-directional hydraulic drag brake and includes a fluid circuit 410, a PRV 420, a hydraulic rectifier 430 and a pump 440. The hydraulic drag brake 400 can further include an accumulator 450 that is configured to maintain a predefined pressure on a suction side of the pump 440. The hydraulic rectifier 430 is configured to permit fluid flow through the fluid circuit 410 and over the PRV 420 in one direction regardless of the pumping direction of the pump 440. The PRV 420 operates similarly as described above and allows for a setting of a same torque in either driving direction of the pump 440.

Technical effects and benefits of the present disclosure are the provision of a hydraulic brake device that eliminates a common failure mode and increases a secondary flight system duty cycle.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hydraulic drag brake for use with a driveline, the hydraulic drag brake comprising:
    a fluid circuit comprising first and second loops;
    a first valve disposed along the first loop to allow a flow of fluid through the first loop in a first direction and to prevent a flow of the fluid through the first loop in a second direction;
    a second valve disposed along the second loop; and
    a pump coupled to the driveline and configured to pump the fluid through the fluid circuit in the first direction and across the first valve with the driveline occupying a retracted position or engaging in an extend motion and in the second direction and over the second valve with the driveline occupying an extended position.

2. The hydraulic drag brake according to claim 1, wherein the flow of the fluid in the second direction is opposite the flow of the fluid in the first direction.

3. The hydraulic drag brake according to claim 1, further comprising an accumulator configured to maintain pressure on a suction side of the pump.

4. The hydraulic drag brake according to claim 1, wherein the first valve comprises a check valve and the second valve comprises a pressure regulating valve (PRV).

5. The hydraulic drag brake according to claim 4, wherein fluid flow over the PRV generates drag above a predefined torque of the driveline and hydraulic lock below the predefined torque of the driveline.

6. An aircraft, comprising:
    fuselage;
    wings extending outwardly from the fuselage and comprising controllable surfaces;
    a power distribution unit (PDU) disposed in the fuselage and configured to generate power for driving extensions and retractions of the controllable surfaces;
    the driveline and the hydraulic brake according to claim 1; and
    a torque tube comprising the driveline disposed to transmit torque from the PDU to the controllable surfaces, wherein the hydraulic drag brake is disposed along the driveline of the torque tube.

7. The aircraft according to claim 6, wherein the controllable surfaces are disposed at one or more of leading and trailing edges of the wings.

8. The aircraft according to claim 6, wherein the controllable surfaces and the hydraulic drag brake are disposed at a distal end of the driveline of the torque tube.

9. The hydraulic drag brake according to claim 5, further comprising:
    an additional check valve disposed along the second loop to allow the flow of the fluid through the second loop in the second direction and to prevent the flow of the fluid through the second loop in the second direction, and
    an additional PRV disposed along the first loop to generate drag above a second predefined torque of the driveline and hydraulic lock below the second predefined torque of the driveline.

10. The hydraulic drag brake according to claim 9, wherein the flow of the fluid in the second direction is opposite the flow of the fluid in the first direction.

11. The hydraulic drag brake according to claim 9, further comprising an accumulator configured to maintain pressure on a suction side of the pump.

12. An aircraft, comprising:
    fuselage;
    wings extending outwardly from the fuselage and comprising controllable surfaces;
    a power distribution unit (PDU) disposed in the fuselage and configured to generate power for driving extensions and retractions of the controllable surfaces;
    a torque tube comprising the driveline according to claim 9 disposed to transmit torque from the PDU to the controllable surfaces; and
    the hydraulic drag brake according to claim 9, which is disposed along the driveline of the torque tube.

13. The aircraft according to claim 12, wherein the controllable surfaces are disposed at one or more of leading and trailing edges of the wings.

14. The aircraft according to claim 12, wherein the controllable surfaces and the hydraulic drag brake are disposed at a distal end of the driveline of the torque tube.

15. A self-contained bi-directional hydraulic drag brake for use with a driveline, the self-contained bi-directional hydraulic drag brake comprising:
   a fluid circuit;
   a pressure regulating valve (PRV) disposed along the fluid circuit;
   a hydraulic rectifier disposed along the fluid circuit downstream from the PRV; and
   a pump coupled to the driveline and configured to pump fluid through the fluid circuit in a first direction and over the PRV and through the hydraulic rectifier with the driveline occupying a retracted position or engaging in an extend motion and in a second direction and over the PRV and through the hydraulic rectifier with the driveline occupying an extended position.

16. The hydraulic drag brake according to claim 15, wherein fluid flow over the PRV in the first direction and the second direction generates drag above a predefined torque of the driveline and hydraulic lock below the predefined torque of the driveline.

17. The hydraulic drag brake according to claim 16, wherein the flow of the fluid in the second direction is opposite the flow of the fluid in the first direction.

18. The hydraulic drag brake according to claim 16, further comprising an accumulator configured to maintain pressure on a suction side of the pump.

19. An aircraft, comprising:
   fuselage;
   wings extending outwardly from the fuselage and comprising controllable surfaces;
   a power distribution unit (PDU) disposed in the fuselage and configured to generate power for driving extensions and retractions of the controllable surfaces;
   the driveline and the hydraulic brake according to claim 15; and
   a torque tube comprising the driveline disposed to transmit torque from the PDU to the controllable surfaces,
   wherein the hydraulic drag brake is disposed along the driveline of the torque tube.

20. The aircraft according to claim 19, wherein:
   the controllable surfaces are disposed at one or more of leading and trailing edges of the wings, and
   the controllable surfaces and the hydraulic drag brake are disposed at a distal end of the driveline of the torque tube.

* * * * *